(12) United States Patent
Higurashi

(10) Patent No.: US 7,124,434 B2
(45) Date of Patent: Oct. 17, 2006

(54) INFORMATION TRANSMISSION SYSTEM, AND INFORMATION SENDING APPARATUS AND INFORMATION RECEIVING APPARATUS USED THEREIN

(75) Inventor: Seiji Higurashi, Fuchu (JP)

(73) Assignee: Victor Company of Japan, Ltd., Yokohama (JP)

( * ) Notice: Subject to any disclaimer, the term of this patent is extended or adjusted under 35 U.S.C. 154(b) by 234 days.

(21) Appl. No.: 10/869,847

(22) Filed: Jun. 18, 2004

(65) Prior Publication Data

US 2005/0015597 A1    Jan. 20, 2005

(30) Foreign Application Priority Data

Jul. 17, 2003    (JP)    ............................. 2003-275807

(51) Int. Cl.
*G06F 7/04*    (2006.01)
(52) U.S. Cl. ................. 726/5; 726/4; 726/19; 380/274; 380/268; 380/260; 380/239
(58) Field of Classification Search .................. 726/21, 726/19, 5, 4; 380/204, 239, 244, 258, 259, 380/260, 261, 268, 274, 31
See application file for complete search history.

(56) References Cited

U.S. PATENT DOCUMENTS

| | | | |
|---|---|---|---|
| 4,579,252 A | | 4/1986 | Wilson et al. |
| 4,614,264 A | | 9/1986 | Fishburne |
| 5,159,633 A | * | 10/1992 | Nakamura .................... 380/30 |
| 5,537,619 A | * | 7/1996 | Higurashi et al. ........... 375/240 |
| 5,633,684 A | * | 5/1997 | Teranishi et al. ....... 375/240.11 |
| 5,751,509 A | * | 5/1998 | Ogasawara et al. ........... 360/70 |
| 5,933,568 A | * | 8/1999 | Higurashi et al. ............ 386/68 |
| 6,477,254 B1 | * | 11/2002 | Miyazaki et al. ........... 380/286 |
| 6,526,385 B1 | * | 2/2003 | Kobayashi et al. .......... 704/504 |
| 6,819,643 B1 | * | 11/2004 | Kobayashi et al. ....... 369/53.21 |
| 6,987,715 B1 | * | 1/2006 | Kobayashi et al. ....... 369/47.19 |
| 7,006,633 B1 | * | 2/2006 | Reece ......................... 380/260 |
| 7,024,561 B1 | * | 4/2006 | Inoha et al. ................. 713/182 |
| 7,027,384 B1 | * | 4/2006 | Ohbi et al. ............... 369/275.3 |

FOREIGN PATENT DOCUMENTS

CA    1216867    1/1987

(Continued)

OTHER PUBLICATIONS

Japanese book, *Modern Cipher*, Tatsuaki Okamoto and Hirosuke Yamamoto, published Jun. 30, 1997.

*Primary Examiner*—Norman M. Wright
(74) *Attorney, Agent, or Firm*—Louis Woo

(57) ABSTRACT

A receiver sends a first random number to a transmitter. The transmitter generates a sync signal in response to the first random number sent from the receiver. The transmitter embeds the sync signal and key information in a second random number to generate a composite signal. In the composite signal, the sync signal is a position indicator for the key information. The transmitter sends the composite signal to the receiver. The transmitter generates an encryption key from the key information. The receiver detects the sync signal in the composite signal sent from the transmitter. The receiver extracts the key information from the composite signal in response to the detected sync signal. The receiver generates an encryption key from the extracted key information. The encryption key generated by the receiver is equal to that generated by the transmitter. Thus, the transmitter and the receiver hold the same encryption key in common.

12 Claims, 8 Drawing Sheets

FOREIGN PATENT DOCUMENTS

GB 2160987 A 1/1986
GB 2305733 A 4/1997

* cited by examiner

INFORMATION TRANSMISSION SYSTEM, AND INFORMATION SENDING APPARATUS AND INFORMATION RECEIVING APPARATUS USED THEREIN

BACKGROUND OF THE INVENTION

1. Field of the Invention

This invention generally relates to an information transmission system. This invention particularly relates to a system for encrypting a great amount of, for example, image information and transmitting the encryption-resultant information. This invention also relates to an information sending apparatus and an information receiving apparatus used in an information transmission system.

2. Description of the Related Art

In some of conventional information transmission systems, a sending side encrypts information before sending the encryption-resultant information toward a receiving side, and the receiving side decrypts the incoming information into the original information. The encryption is to protect the information against an illegal attack such as a tapping or altering action during the transmission thereof. Known encryption methods include first one called stream cipher, and second one utilizing authentication about a communication opposite party.

Japanese book entitled "Modern Cipher", written by Tatsuaki Okamoto and Hirosuke Yamamoto, published by Sangyo-Tosho Kabushikikaisha on Jun. 30, 1997, pages 73–75, discloses stream cipher designed so that a sending side modulo-2-adds an information bit stream and a key bit stream on a bit-by-bit basis to get an encryption-resultant bit stream, and a receiving side modulo-2-adds the encryption-resultant bit stream and a key bit stream on a bit-by-bit basis to recover the original information bit stream. The key bit stream used by the receiving side is the same as that used by the sending side. In practice, the sending side and the receiving side generate a pseudo-random-number bit stream, and hold it as a common key bit stream.

The foregoing Japanese book, pages 151–162, also discloses password-based certification about a communication opposite party, secret key cryptography, public key cryptography, and digital-signature-based authentication.

According to the password-based certification, a user secretly has a password. The user sends the password to a center (an inspector or a verifier) when requesting an access to the center. In the center, a check is made as to whether or not the password is correct. When the password is correct, the user is proved to be legitimate. Then, user's access to the center is granted.

In the secret key cryptography, a user and an inspector (a verifier) have a common secret key. The user encrypts information in response to the secret key. The user sends the encryption-resultant information to the inspector. The inspector decrypts the incoming information in response to the secret key to recover the original information.

In the public key cryptography, each user or inspector has a pair of a private key and a public key corresponding to the private key. An inspector encrypts information in response to a public key of a user. The inspector sends the encryption-resultant information to the user. The user decrypts the incoming information in response to user's private key. The user sends the decryption-resultant information to the inspector. The inspector compares the incoming information with the original information to decide whether or not the user has a correct private key corresponding to user's public key, that is, whether or not the user is legitimate.

Generally, digital signatures rely on public key cryptography. According to the digital-signature-based authentication, an inspector sends information to a user. The user scrambles the incoming information in response to user's private key to generate a digital signature. The user sends the digital signature to the inspector. The inspector descrambles the digital signature in response to user's public key. The inspector collates the result of the descrambling with the original information to check whether or not the digital signature is correct, that is, whether or not the user is legitimate.

The above-mentioned cryptography and authentication are based on the difficulties in solving particular mathematical problems such as integer prime-factorization problems or discrete logarithm problems.

Typical information transmission systems include a combination of hardware and software (that is, a computer and a program) for implementing encryption and decryption. In the typical systems, a great part of encryption and decryption work is assigned to the software so that a time taken to complete the work tends to be long. Accordingly, the typical systems tend to take a long time to perform certification or authentication.

SUMMARY OF THE INVENTION

It is a first object of this invention to provide a relatively-simple information transmission system which can implement certification or authentication in a short time.

It is a second object of this invention to provide a relatively-simple information sending apparatus which enables certification or authentication to be implemented in a short time.

It is a third object of this invention to provide a relatively-simple information receiving apparatus which enables certification or authentication to be implemented in a short time.

A first aspect of this invention provides an information transmission system comprising an information sending apparatus for sending encryption-resultant main information; an information receiving apparatus for receiving the encryption-resultant main information from the information sending apparatus; first means for, before the information sending apparatus sends the encryption-resultant main information to the information receiving apparatus, performing transmission of specified information between the information sending apparatus and the information receiving apparatus to enable the information sending apparatus and the information receiving apparatus to hold in common an encryption key used to encrypt original main information and decrypt the encryption-resultant main information; second means for generating a first random number; third means in the information receiving apparatus for sending the first random number generated by the second means toward the information sending apparatus; fourth means in the information sending apparatus for generating a sync signal in response to the first random number sent from the information receiving apparatus; fifth means in the information sending apparatus for generating key information relating to the encryption key; sixth means for adding the key information generated by the fifth means to a position immediately following the sync signal generated by the fourth means to generate a set of the sync signal and the key information, wherein the sync signal indicates a position of the key information; seventh means for generating a second random number; eighth means for embedding the set of the sync signal and the key information which is generated by the sixth means in the second random number generated by the seventh means to generate a composite signal; ninth means in the information sending apparatus for sending the composite signal generated by the eighth means toward the information receiving apparatus; tenth means for generating the encryption key in response to the key information generated by the fifth means; eleventh means for encrypting the original main information in response to the encryption key generated by the tenth means to generate the encryption-resultant main information; twelfth means in the information sending apparatus for sending the encryption-resultant main information generated by the eleventh means toward the information receiving apparatus; thirteenth means in the information receiving apparatus for detecting the sync signal in the composite signal sent from the information sending apparatus; fourteenth means in the information receiving apparatus for extracting the key information from the composite signal in response to the sync signal detected by the thirteenth means; fifteenth means in the information receiving apparatus for generating the encryption key in response to the key information extracted by the fourteenth means; and sixteenth means in the information receiving apparatus for decrypting the encryption-resultant main information sent from the information sending apparatus in response to the encryption key generated by the fifteenth means.

A second aspect of this invention is based on the first aspect thereof, and provides an information transmission system wherein the information receiving apparatus comprises seventeenth means for holding a first predetermined key, and eighteenth means for encrypting the first random number in response to the first predetermined key to generate an encryption-resultant first random number, wherein the third means in the information receiving apparatus is operative for sending the encryption-resultant first random number generated by the eighteenth means toward the information sending apparatus, wherein the information sending apparatus comprises nineteenth means for holding a second predetermined key equal to the first predetermined key, and twentieth means for decrypting the encryption-resultant first random number sent from the information receiving apparatus in response to the second predetermined key to recover the first random number, and wherein the fourth means in the information sending apparatus is operative for generating the sync signal in response to the first random number recovered by the twentieth means.

A third aspect of this invention is based on the first aspect thereof, and provides an information transmission system wherein the information sending apparatus comprises seventeenth means for generating a third random number, and eighteenth means for holding a first predetermined key, wherein the fifth means in the information sending apparatus is operative for encrypting the third random number in response to the first predetermined key to generate the key information, wherein the information receiving apparatus comprises nineteenth means for holding a second predetermined key equal to the first predetermined key, and twentieth means for decrypting the key information extracted by the fourteenth means in response to the second predetermined key to recover the third random number, and wherein the fifteenth means in the information receiving apparatus is operative for generating the encryption key in response to the third random number recovered by the twentieth means.

A fourth aspect of this invention is based on the first aspect thereof, and provides an information transmission system further comprising seventeenth means for removing a portion equal in bit sequence pattern to the sync signal from the second random number generated by the seventh means to generate a processing-resultant random number, and wherein the eighth means is operative for embedding the set of the sync signal and the key information in the processing-resultant random number generated by the seventeenth means to generate the composite signal.

A fifth aspect of this invention is based on the first aspect thereof, and provides an information transmission system wherein the information receiving apparatus comprises seventeenth means for encrypting at least a part of the key information extracted by the fourteenth means in response to the encryption key generated by the fifteenth means to generate an acknowledgment signal, and eighteen means for sending the acknowledgment signal generated by the seventeenth means toward the information sending apparatus, wherein the information sending apparatus comprises nineteenth means for decrypting the acknowledgment signal sent from the information receiving apparatus in response to the encryption key generated by the tenth means to generate a decryption-resultant signal, and twentieth means for deciding whether or not the decryption-resultant signal generated by the nineteenth means matches at least a corresponding part of the key information generated by the fifth means.

A sixth aspect of this invention provides an information sending apparatus for use in an information transmission system. The information sending apparatus is operative for sending encryption-resultant main information. The information transmission system comprises an information receiving apparatus for receiving the encryption-resultant main information from the information sending apparatus, and means for, before the information sending apparatus sends the encryption-resultant main information to the information receiving apparatus, performing transmission of specified information between the information sending apparatus and the information receiving apparatus to enable the information sending apparatus and the information receiving apparatus to hold in common an encryption key used to encrypt original main information and decrypt the encryption-resultant main information. The information sending apparatus comprises first means for receiving a first random number from the information receiving apparatus; second means for generating a sync signal in response to the first random number received by the first means; third means for generating a second random number; fourth means for generating the encryption key in response to the second random number generated by the third means; fifth means for holding a predetermined key; sixth means for encrypting the second random number generated by the third means in response to the predetermined key held by the fifth means to generate encryption-resultant key information; seventh means for adding the sync signal generated by the second means to a position immediately preceding the encryption-resultant key information generated by the sixth means to generate a set of the sync signal and the encryption-resultant key information, wherein the sync signal indicates a position of the encryption-resultant key information; eighth means for generating a third random number; ninth means for embedding the set of the sync signal and the encryption-resultant key information which is generated by the seventh means in the third random number generated by the eighth means to generate a composite signal; tenth means for sending the composite signal generated by the ninth means toward the information receiving apparatus; eleventh means for encrypting the original main information in response to the encryption key generated by the fourth means to generate the encryption-resultant main information; and twelfth means for sending the encryption-resultant main information generated by the eleventh means toward the information receiving apparatus.

A seventh aspect of this invention provides an information receiving apparatus for use in an information transmission system comprising an information sending apparatus for sending encryption-resultant main information. The information receiving apparatus is operative for receiving the encryption-resultant main information from the information sending apparatus. The information transmission system further comprises means for, before the information sending apparatus sends the encryption-resultant main information to the information receiving apparatus, performing transmission of specified information between the information sending apparatus and the information receiving apparatus to enable the information sending apparatus and the information receiving apparatus to hold in common an encryption key used to encrypt original main information and decrypt the encryption-resultant main information. The information receiving apparatus comprises first means for generating a first random number; second means for sending the first random number generated by the first means toward the information sending apparatus; third means for receiving, from the information sending apparatus, a composite signal in which a sync signal and encryption-resultant key information are embedded, the sync signal depending on the first random number sent by the second means, the encryption-resultant key information being added to a position immediately following the sync signal, the sync signal indicating a position of the encryption-resultant key information; fourth means for detecting the sync signal in the composite signal received by the third means; fifth means for extracting the encryption-resultant key information from the composite signal in response to the sync signal detected by the fourth means; sixth means for holding a predetermined key; seventh means for decrypting the encryption-resultant key information extracted by the fifth means in response to the predetermined key to generate decryption-resultant information; eighth means for generating the encryption key in response to the decryption-resultant information generated by the seventh means; ninth means for receiving the encryption-resultant main information from the information sending apparatus; and tenth means for decrypting the encryption-resultant main information received by the ninth means in response to the encryption key generated by the eighth means.

An eighth aspect of this invention provides an information transmission system comprising a first apparatus and a second apparatus holding an encryption key in common. The system comprises first means in the first apparatus for receiving a first random number from the second apparatus; second means for generating a sync signal in response to the first random number received by the first means; third means in the first apparatus for holding the encryption key; fourth means for generating key information relating to the encryption key held by the third means; fifth means for adding the key information generated by the fourth means to a position immediately following the sync signal generated by the second means to generate a set of the sync signal and the key information, wherein the sync signal indicates a position of the key information; sixth means for generating a second random number; seventh means for embedding the set of the sync signal and the key information which is generated by the fifth means in the second random number generated by the sixth means to generate a composite signal; eighth means in the first apparatus for sending the composite signal generated by the seventh means toward the second apparatus; ninth means in the second apparatus for receiving the composite signal from the first apparatus; tenth means in the second apparatus for generating the first random number; eleventh means in the second apparatus for sending the first random number generated by the tenth means toward the first apparatus; twelfth means for generating, in response to the first random number generated by the tenth means, a sync signal equal to the sync signal generated by the second means; thirteenth means for comparing the sync signal generated by the twelfth means and the composite signal received by the ninth means to detect the sync signal in the composite signal; fourteenth means for extracting the key information from the composite signal in response to the sync signal detected by the thirteenth means; and fifteenth means in the second apparatus for generating the encryption key in response to the key information extracted by the fourteenth means; wherein the encryption key held by the third means in the first apparatus and the encryption key generated by the fifteenth means in the second apparatus are equal to each other.

A ninth aspect of this invention is based on the eighth aspect thereof, and provides an information transmission system wherein the second apparatus comprises sixteenth means for encrypting at least a part of the key information extracted by the fourteenth means in response to the encryption key generated by the fifteenth means to generate acknowledgment information, and seventeenth means for sending the acknowledgment information generated by the sixteenth means toward the first apparatus, and wherein the first apparatus comprises eighteenth means for decrypting the acknowledgment information sent from the second apparatus in response to the encryption key held by the third means to generate decryption-resultant information, and nineteenth means for comparing the decryption-resultant information generated by the eighteenth means and at least a corresponding part of the key information generated by the fourth means to confirm whether the first apparatus and the second apparatus hold common key information.

A tenth aspect of this invention provides an information sending apparatus for use in an transmission system comprising an information receiving apparatus. The information sending apparatus and the information receiving apparatus hold an encryption key in common. The information sending apparatus comprises first means for receiving a first random number from the information receiving apparatus; second means for generating a sync signal in response to the first random number received by the first means; third means for holding the encryption key; fourth means for generating key information relating to the encryption key held by the third means; fifth means for adding the key information generated by the fourth means to a position immediately following the sync signal generated by the second means to generate a set of the sync signal and the key information, wherein the sync signal indicates a position of the key information; sixth means for generating a second random number; seventh means for embedding the set of the sync signal and the key information which is generated by the fifth means in the second random number generated by the sixth means to generate a composite signal; and eighth means for sending the composite signal generated by the seventh means toward the information receiving apparatus; wherein the composite signal enables the information receiving apparatus to have an encryption key equal to the encryption key held by the third means in the information sending apparatus.

An eleventh aspect of this invention provides an information receiving apparatus for use in an transmission system comprising an information sending apparatus. The information sending apparatus and the information receiving apparatus hold an encryption key in common. The information receiving apparatus comprises first means for generating a first random number; second means for sending the first random number generated by the first means toward the information sending apparatus; third means for receiving, from the information sending apparatus, a composite signal in which a sync signal and key information are embedded, the sync signal being generated by the information sending apparatus and depending on the first random number sent by the second means, the key information being added to a position immediately following the sync signal, the sync signal indicating a position of the key information; fourth means for generating, in response to the first random number generated by the first means, a sync signal equal to the sync signal generated by the information sending apparatus; fifth means for comparing the sync signal generated by the fourth means and the composite signal received by the third means to detect the sync signal in the composite signal; sixth means for extracting the key information from the composite signal in response to the sync signal detected by the fifth means; and seventh means for generating the encryption key in response to the key information extracted by the sixth means; wherein the encryption key generated by the seventh means is equal to the encryption key held by the information sending apparatus.

A twelfth aspect of this invention provides an information transmission system comprising a first apparatus; a second apparatus; first means in the first apparatus for generating a first random number signal; second means for sending the first random number signal generated by the first means from the first apparatus to the second apparatus; third means in the second apparatus for generating a signal representative of a first encryption key in response to original key information; fourth means in the second apparatus for encrypting the original key information into cipher key information; fifth means in the second apparatus for generating a sync signal in response to the first random number signal sent by the second means; sixth means in the second apparatus for generating a second random number signal; seventh means in the second apparatus for embedding the sync signal generated by the fifth means and the cipher key information generated by the fourth means in the second random number signal generated by the sixth means to get a composite signal in which the sync signal and the cipher key information are in a predetermined positional relation; eighth means for sending the composite signal generated by the seventh means from the second apparatus to the first apparatus; ninth means in the first apparatus for detecting the sync signal in the composite signal sent by the eighth means in response to the first random number signal generated by the first means; tenth means in the first apparatus for detecting the cipher key information in the composite signal in response to the sync signal detected by the ninth means; eleventh means in the first apparatus for decrypting the cipher key information detected by the tenth means to recover the original key information; and twelfth means in the first apparatus for generating a signal representative of a second encryption key in response to the original key information recovered by the eleventh means; wherein the first encryption key in the second apparatus and the second encryption key in the first apparatus are equal.

This invention has advantages mentioned below. According to this invention, an information sending apparatus generates a sync signal in response to a first random number sent from an information receiving apparatus. Key information relates to an encryption key held by the information sending apparatus. The information sending apparatus embeds the sync signal and the key information in a second random number to generate a composite signal. In the composite signal, the sync signal is a position indicator for the key information. The information sending apparatus sends the composite signal toward the information receiving apparatus. The information receiving apparatus detects the sync signal in the composite signal sent from the information sending apparatus. The information receiving apparatus extracts the key information from the composite signal in response to the detected sync signal. The information receiving apparatus recovers the encryption key from the extracted key information. As a result, the information sending apparatus and the information receiving apparatus hold the same encryption key in common. The foregoing steps of operation of the information sending apparatus and the information receiving apparatus are implemented by hardware rather than software. Therefore, the foregoing operation steps can be quickly carried out. The structure of the hardware is relatively simple.

In this invention, the key information is transmitted while being embedded in the second random number. Thus, during the transmission, the key information is concealed in the second random number. Accordingly, the key information can be safely transmitted.

In this invention, the first random number and the key information may be encrypted in response to a predetermined key before being transmitted. In this case, it is possible to provide more adequate security of the first random number and the key information during the transmission.

DETAILED DESCRIPTION OF THE INVENTION

First Embodiment

Figure 1:
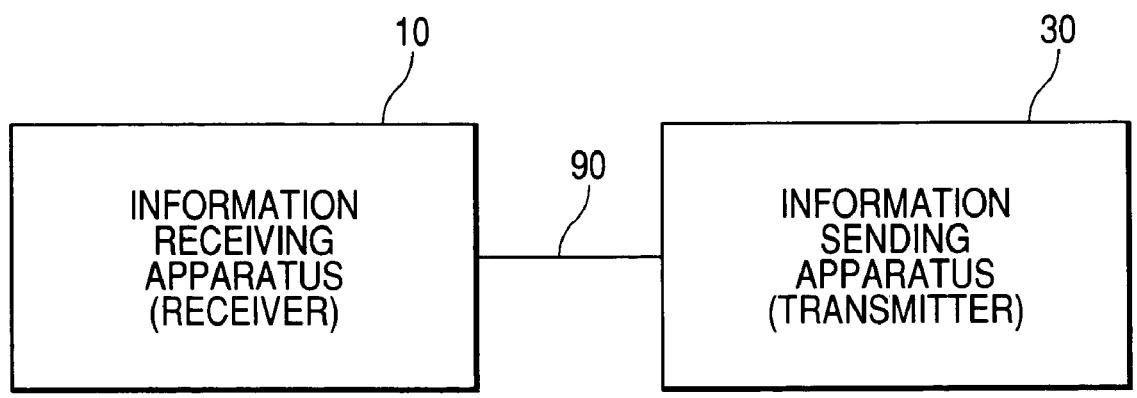
FIG. 1 is a block diagram of an information transmission system according to a first embodiment of this invention.

FIG. 1 shows an information transmission system according to a first embodiment of this invention. The information transmission system of FIG. 1 includes an information receiving apparatus 10 and an information sending apparatus 30 which are bidirectionally connected via a given transmission line 90 containing, for example, a spatial transmission medium or a communication network.

The information sending apparatus 30 serves as a transmitter for sending main information. The information receiving apparatus 10 serves as a receiver for receiving the main information from the transmitter. The information receiving apparatus 10 and the information sending apparatus 30 are also referred to as the receiver 10 and the transmitter 30, respectively. The main information contains a large amount of, for example, video information.

Before the main information is transmitted, prescribed signals inclusive of key information are transmitted between the transmitter 30 and the receiver 10 so that the same key information can be held in common by them. After the key information is provided in both the transmitter 30 and the receiver 10, the transmitter 30 sends the main information to the receiver 10. The sent main information may include an added sync signal.

Figure 2:
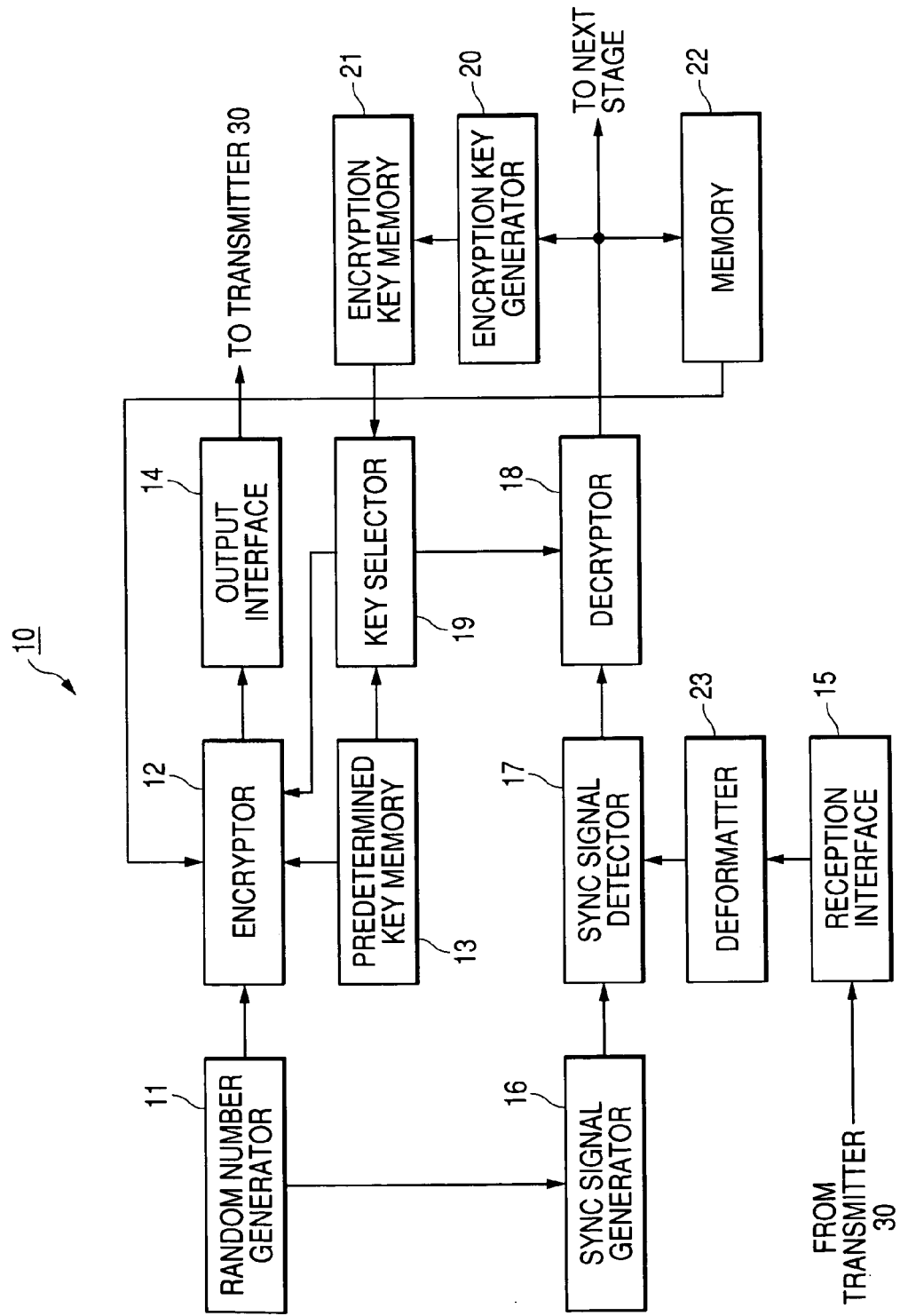
FIG. 2 is a block diagram of a receiver in FIG. 1.

As shown in FIG. 2, the receiver 10 includes a random number generator 11, an encryptor 12, a memory 13, an output interface 14, a reception interface 15, a sync signal generator 16, a sync signal detector 17, a decryptor 18, a key selector 19, an encryption key generator 20, memories 21 and 22, and a deformatter 23.

The random number generator 11 is connected with the encryptor 12 and the sync signal generator 16. The encryptor 12 is connected with the memory 13, the output interface 14, the key selector 19, and the memory 22. The memory 13 is connected with the key selector 19. The output interface 14 leads to the transmitter 30 via the transmission line 90. The reception interface 15 leads from the transmitter 30 via the transmission line 90. The reception interface 15 is connected with the deformatter 23. The deformatter 23 is connected with the sync signal detector 17. The sync signal generator 16 is connected with the sync signal detector 17. The sync signal detector 17 is connected with the decryptor 18. The decryptor 18 is connected with the key selector 19, the encryption key generator 20, and the memory 22. The key selector 19 is connected with the memory 21. The encryption key generator 20 is connected with the memory 21.

It is preferable that the devices 11–23 can be controlled by a receiver controller (not shown).

Figure 3:
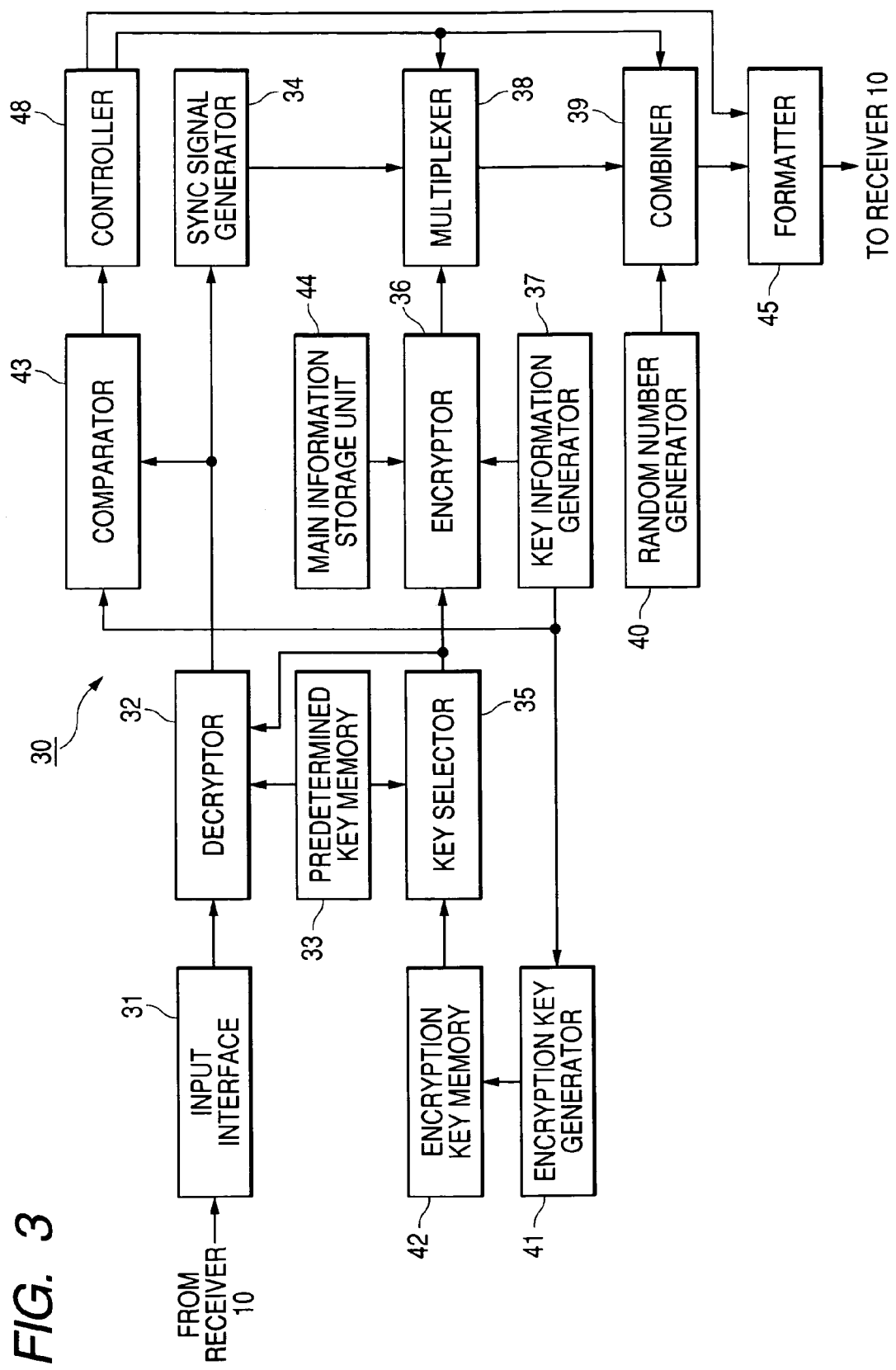
FIG. 3 is a block diagram of a transmitter in FIG. 1.

As shown in FIG. 3, the transmitter 30 includes an input interface 31, a decryptor 32, a memory 33, a sync signal generator 34, a key selector 35, an encryptor 36, a key information generator 37, a multiplexer or an adder 38, a combiner 39, a random number generator 40, an encryption key generator 41, a memory 42, a comparator 43, a storage unit 44, a formatter 45, and a controller 48.

The input interface 31 leads from the receiver 10 via the transmission line 90. The input interface 31 is connected with the decryptor 32. The decryptor 32 is connected with the memory 33, the sync signal generator 34, the key selector 35, and the comparator 43. The memory 33 is connected with the key selector 35. The sync signal generator 34 is connected with the multiplexer 38. The key selector 35 is connected with the encryptor 36 and the memory 42. The encryptor 36 is connected with the key information generator 37, the multiplexer 38, and the storage unit 44. The key information generator 37 is connected with the encryption key generator 41 and the comparator 43. The multiplexer 38 is connected with the combiner 39 and the controller 48. The combiner 39 is connected with the random number generator 40, the formatter 45, and the controller 48. The encryption key generator 41 is connected with the memory 42. The comparator 43 is connected with the controller 48. The formatter 45 is connected with the controller 48. The formatter 45 leads to the receiver 10 via the transmission line 90.

It is preferable that the controller 48 can control the devices 31–45.

The controller 48 can change the multiplexer 38 between an active state and a through state. The multiplexer 38 operates normally when being in its active state. The multiplexer 38 passes an input signal to a next stage and does not process the input signal when being in its through state. Furthermore, the controller 48 can change the combiner 39 between an active state and a through state. The combiner 39 operates normally when being in its active state. The combiner 39 passes an input signal to a next stage and does not process the input signal when being in its through state.

The reception interface 15 in the receiver 10 is designed to receive signals from the transmitter 30. The output interface 14 in the receiver 10 is designed to send signals to the transmitter 30. The formatter 45 in the transmitter 30 includes an output interface for sending signals to the receiver 10. The input interface 31 in the transmitter 30 is designed to receive signals from the receiver 10. Signals can be transmitted between the receiver 10 and the transmitter 30 via the transmission line 90 on a wireless communication basis, a wire communication basis, or an optical communication basis. The memory 13 in the receiver 10 is preloaded with a signal representing a predetermined key. The memory 33 in the transmitter 30 is preloaded with a signal representing a predetermined key equal to that in the receiver 10. Thus, the predetermined key represented by the signal in the receiver memory 13 and the predetermined key represented by the signal in the transmitter memory 33 are the same. The storage unit 44 in the transmitter 30 stores main information (contents information) which includes, for example, video information.

The information transmission system, the receiver 10, and the transmitter 30 operate as follows.

Figure 4:
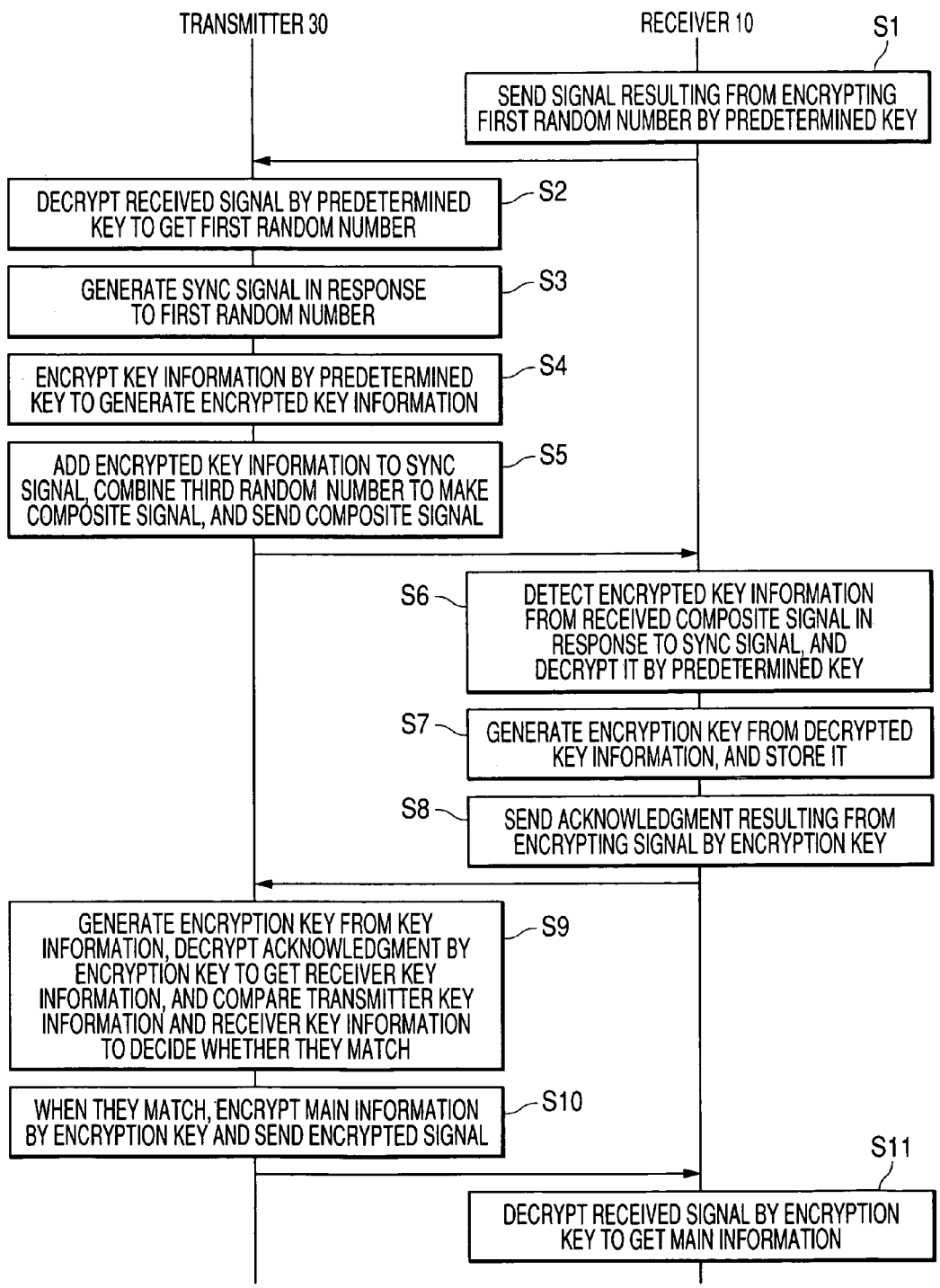
FIG. 4 is a diagram showing a sequence of processing implemented in the information transmission system of FIG. 1.

With reference to FIG. 4, at a stage S1, the random number generator 11 in the receiver 10 produces a signal representative of a first random number which will be a base of a sync signal. The random number generator 11 feeds the first random number signal to the encryptor 12. The encryptor 12 reads out the signal representative of the predetermined key from the memory 13. The device 12 encrypts the first random number signal in response to the predetermined key signal according to an encryption procedure such as DES (Data Encryption Standard), and thereby generates a first encryption-resultant random number signal. It should be noted that the same predetermined key is held in common by the receiver 10 and the transmitter 30. The encryptor 12 feeds the first encryption-resultant random number signal to the output interface 14. The output interface 14 sends the first encryption-resultant random number signal to the transmitter 30.

The input interface 31 in the transmitter 30 receives the first encryption-resultant random number signal. The input interface 31 passes the first encryption-resultant random number signal to the decryptor 32.

At a stage S2 following the stage S1, the decryptor 32 in the transmitter 30 reads out the signal representative of the predetermined key from the memory 33. It should be noted that the predetermined key is the same as that in the receiver 10. The device 32 decrypts the first encryption-resultant random number signal in response to the predetermined key signal, and thereby recovers the first random number signal.

At a stage S3 subsequent to the stage S2, the decryptor 32 in the transmitter 30 feeds the first random number signal to the sync signal generator 34. The device 34 generates a first sync signal (a key-data sync signal) from the first random number signal by utilizing, for example, a predetermined one way function. The decryptor 32 feeds the first sync signal to the multiplexer 38. The first sync signal will be used for the transmission of information concerning a contents key.

At a stage S4 following the stage S3, the key information generator 37 in the transmitter 30 produces key information, that is, information relating to a contents key. The key information includes, for example, a signal representative of a second random number. The key information generator 37 feeds the key information (the second random number signal) to the encryptor 36. The key selector 35 receives signals from the memories 33 and 42, and selects one thereamong and passes the selected signal to the decryptor 32 and the encryptor 36. In this case, the key selector 35 transmits the predetermined key signal from the memory 33 to the encryptor 36. The device 36 encrypts the key information in response to the predetermined key signal according to an encryption procedure such as DES (Data Encryption Standard), and thereby generates encryption-resultant key information also referred to as key data.

At a stage S5 subsequent to the stage S4, the encryptor 36 in the transmitter 30 feeds the encryption-resultant key information (the key data) to the multiplexer 38. The multiplexer 38 adds the encryption-resultant key information to the end of the first sync signal fed from the sync signal generator 34. The multiplexer 38 feeds the resultant set of the first sync signal and the encryption-resultant key information to the combiner 39. The random number generator 40 produces a signal containing a large amount of data representing a third random number. The random number generator 40 feeds the third random number signal to the combiner 39. The combiner 39 embeds the set of the first sync signal and the encryption-resultant key information in the third random number signal to generate a first composite signal. The combiner 39 feeds the first composite signal to the formatter 45. The formatter 45 processes the first composite signal on a block-by-block basis where every block has a given number of bits. The formatter 45 includes a sync signal generator for producing a second sync signal (a block sync signal). The formatter 45 adds the second sync signal to the head of every block of the first composite signal. Furthermore, the formatter 45 includes a signal generator for producing a signal of an error check code from the contents of every block. The formatter 45 adds the error check code signal to the end of the corresponding block of the first composite signal. As a result, the device 45 formats the first composite signal into a second composite signal inclusive of second sync signals and error check code signals. The error check code signal will be used for detection of an error or errors in the corresponding block of the first composite signal. Preferably, the error check code is of a CRCC (Cyclic Redundancy Check Code) type. The formatter 45 sends the second composite signal to the receiver 10.

Figure 5:
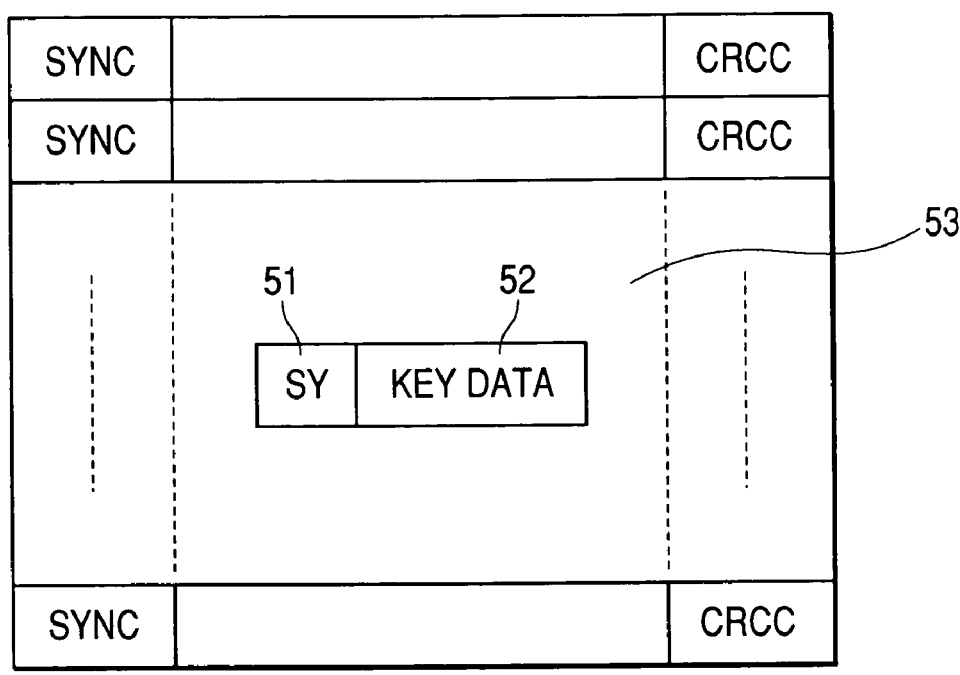
FIG. 5 is a diagram of the structure of a second composite signal sent from the transmitter to the receiver in FIG. 1.

FIG. 5 shows the structure of the second composite signal sent from the transmitter 30 to the receiver 10. In FIG. 5, there is a stack of rows which denote respective blocks of the second composite signal. The head and end of each block is occupied by the second sync signal "SYNC" and the error check code signal "CRCC", respectively. The intermediate portions of the blocks are occupied by the third random number signal 53 in which the set of the first sync signal ("SY") 51 and the encryption-resultant key information (the key data) 52 is embedded. The first sync signal ("SY") 51 and the key data 52 are in a predetermined positional relation. Specifically, the key data 52 extends in a time position immediately following the first sync signal ("SY") 51. The first sync signal ("SY") 51 indicates the position of the key data 52. In other words, the first sync signal ("SY") 51 is a position indicator for the key data 52. As previously mentioned, the first sync signal ("SY") 51 is produced by the sync signal generator 34. The encryption-resultant key information (the key data) 52 is produced by the encryptor 36. The second sync signal "SYNC" and the error check code signal "CRCC" for every block are added by the formatter 45. In FIG. 5, the size of the stack of rows is equal to, for example, 120 kilobits along the horizontal direction (the row direction) and 1 kilobits along the vertical direction (the column direction).

For accurate transmission of information, the receiver 10 is generally required to separate a transmission error and a decryption error from each other. There is a possibility that a portion of the third random number signal 53 which is separate from the first sync signal ("SY") 51 has a bit sequence pattern equal to the first sync signal ("SY") 51. Such a bit sequence pattern is referred to as a false sync signal. The information transmission system is designed to deal with an inconvenience caused by a false sync signal. Specifically, in the information transmission system, signals of an error check code and an error correction code are placed in or added to the ends of a word to be encrypted and an encryption-resultant word.

Figure 6:
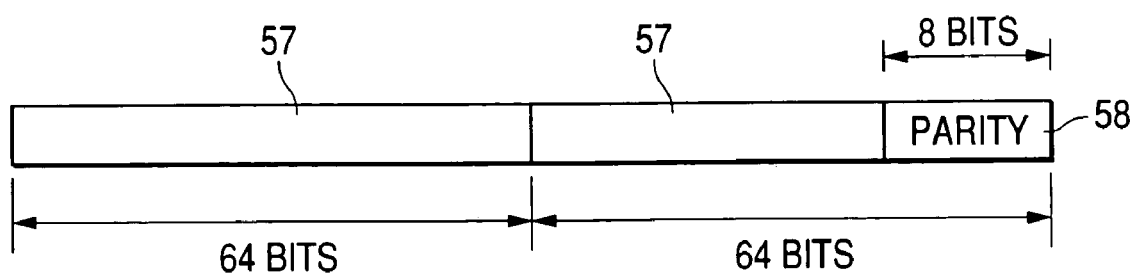
FIG. 6 is a diagram of the structure of a key information word to be encrypted by an encryptor in FIG. 3.

As shown in FIG. 6, a 128-bit word (a pair of 64-bit DES words) 57 to be encrypted has an added 8-bit parity signal (an added 8-bit signal of an error check code) 58 at its end. The 128-bit word 57 except the parity signal 58 is formed by the key information (the second random number signal) produced by the key information generator 37. Thus, the 128-bit word 57 is also called the key information word 57. An output circuit stage of the key information generator 37 includes a parity signal generator which produces the parity signal 58 in response to the key information, and which adds the parity signal 58 to the key information to complete the 128-bit word 57. The key information generator 37 feeds the key-information word 57 inclusive of the parity signal 58 to the encryptor 36. The device 36 encrypts the key information word 57 inclusive of the parity signal 58. The parity signal 58 is used for deciding whether or not the receiver 10 and the transmitter 30 hold a common key, and checking an error caused by detection of a false sync signal.

Figure 7:
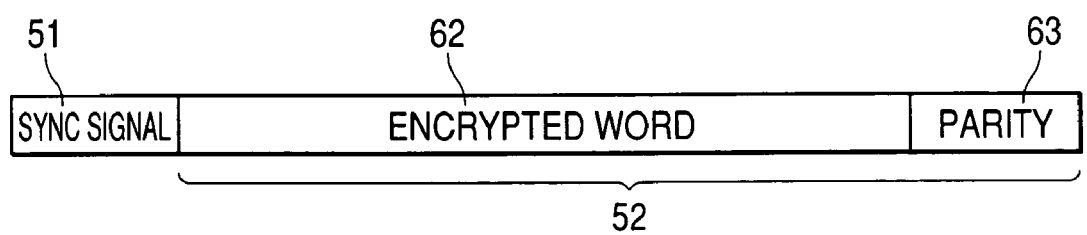
FIG. 7 is a diagram of the structure of a key information signal fed from a multiplexer to a combiner in FIG. 3.

As shown in FIG. 7, a parity signal (a signal of an error correction code) 63 is added to the end of an encryption-resultant word 62 generated by the encryptor 36. The encryption-resultant word 62 means a major part of the encryption-resultant key information (the key data) 52 in FIG. 5. The encryption-resultant word 62 is an encryption-resultant version of the key information word 57 inclusive of the parity signal 58 (see FIG. 6). An output circuit stage of the encryptor 36 includes a parity signal generator which produces the parity signal 63 in response to the encryption-resultant word 62, and which adds the parity signal 63 thereto. The parity-added encryption-resultant word, that is, the set of the encryption-resultant word 62 and the parity signal 63, means the encryption-resultant key information (the key data) 52 in FIG. 5. The encryptor 36 feeds the parity-added encryption-resultant word 52 to the multiplexer 38. The multiplexer 38 adds the first sync signal 51 to the head of the parity-added encryption-resultant word 52, thereby completing a key information signal having the structure of FIG. 7. The multiplexer 38 feeds the key information signal to the combiner 39. The receiver 10 uses the parity signal 63 to separate a transmission error and a decryption error from each other.

The receiver 10 can detect an error of received information in response to the parity signal 63. There are two causes of the detected error. One is a false sync signal, that is, a bit sequence pattern equal to the first sync signal 51 which occurs in the third random number signal 53 (see FIG. 5). The other is a transmission error occurring in the key data 52 (see FIG. 5). Furthermore, the receiver 10 can detect an error of received information in response to the parity signal 58. In the case where an error is detected in response to the parity signal 58 while the detection of an error in response to the parity signal 63 is absent, the detected error is thought to be a decryption error. In the case where both the detection of an error in response to the parity signal 58 and the detection of an error in response to the parity signal 63 are absent, the first sync signal 51 in the received information is true and the key data 52 therein is free from transmission errors and decryption errors. In this case, as will be explained later, a decision is made as to whether or not the receiver 10 and the transmitter 30 have the key data 52 in common by referring to a comparison result provided by the comparator 43 (see FIG. 3).

With reference back to FIG. 4, at a stage S6 following the stage S5, the reception interface 15 in the receiver 10 receives the second composite signal from the transmitter 30. The second composite signal has the structure in FIG. 5. The reception interface 15 passes the second composite signal to the deformatter 23. The deformatter 23 removes the second sync signals "SYNC" and the error check code signals "CRCC" from the second composite signal to recover the first composite signal. Operation of the deformatter 23 is inverse with respect to that of the formatter 45 in the transmitter 30. The deformatter 23 feeds the recovered first composite signal to the sync signal detector 17. The receiver 10 generates a sync signal as the transmitter 30 does. Specifically, the random number generator 11 feeds the first random number signal to the sync signal generator 16. The device 16 generates a third sync signal from the first random number signal by utilizing, for example, a predetermined one way function. The third sync signal is the same as the first sync signal for a contents key. The sync signal generator 16 feeds the third sync signal to the sync signal detector 17. The sync signal detector 17 scans a bit sequence of the recovered first composite signal fed from the deformatter 23 while comparing a periodically-shifted portion of the bit sequence with the third sync signal to find the first sync signal. Thereby, the device 17 detects the first sync signal in the recovered first composite signal. The sync signal detector 17 includes a signal separator for extracting the encryption-resultant key information (the key data) 52 from the recovered first composite signal in response to the detected first sync signal. It should be noted that the encryption-resultant key information 52 extends in a time position immediately following the detected first sync signal. The sync signal detector 17 feeds the encryption-resultant key information 52 to the decryptor 18.

At the stage S6, the key selector 19 in the receiver 10 is fed with signals from the memories 13 and 21, and selects one thereamong and passes the selected signal to the encryptor 12 or the decryptor 18. In this case, the key selector 19 transmits the predetermined key signal from the memory 13 to the decryptor 18. The device 18 decrypts the encryption-resultant key information (the key data) 52 in response to the predetermined key signal, thereby recovering the original key information, that is, the second random number signal produced by the key information generator 37 in the transmitter 30.

At a stage S7 subsequent to the stage S6, the decryptor 18 in the receiver 10 feeds the recovered second random number signal to the encryption key generator 20. The decryptor 18 stores the recovered second random number signal in the memory 22. The encryption key generator 20 produces a signal representative of a second encryption key (a contents key) from the recovered second random number signal. The encryption key generator 20 stores the second encryption key signal in the memory 21.

At a stage S8 following the stage S7, the memory 22 in the receiver 10 feeds a portion of the bit sequence of the recovered second random number signal to the encryptor 12. The key selector 19 transmits the second encryption key signal from the memory 21 to the encryptor 12. The device 12 encrypts the portion of the bit sequence of the recovered second random number signal in response to the second encryption key signal. The encryptor 12 feeds the encryption-resultant signal to the output interface 14. The output interface 14 sends the encryption-resultant signal to the transmitter 30 as an acknowledgment signal.

The input interface 31 in the transmitter 30 receives the acknowledgment signal. The input interface 31 passes the acknowledgment signal to the decryptor 32. In the transmitter 30, the key information generator 37 feeds the key information (the second random number signal) to the encryption key generator 41. The encryption key generator 41 produces a signal representative of a first encryption key (a contents key) from the fed key information. The first encryption key corresponds to the second encryption key produced in the receiver 10. The encryption key generator 41 stores the first encryption key signal in the memory 42.

At a stage S9 subsequent to the stage S8, the key selector 35 transmits the first encryption key signal from the memory 42 to the decryptor 32. The device 32 decrypts the acknowledgment signal in response to the first encryption key signal to recover the original portion of the bit sequence of the recovered second random number signal. The decryptor 32 feeds the recovered original portion of the bit sequence to the comparator 43. The key information generator 37 feeds the key information (the second random number signal) to the comparator 43. The device 43 compares the recovered original portion of the bit sequence with a corresponding portion of the bit sequence of the fed key information (the fed second random number signal) to decide whether or not they match. The comparator 43 feeds a signal representative of the comparison result (the matching result) to the controller 48.

The first encryption key signal produced by the encryption key generator 41 is based on the key information (the second random number signal). The second encryption key signal produced by the encryption key generator 20 is also based on the key information (the second random number signal). When the transmission of information between the receiver 10 and the transmitter 30 is normal, the first encryption key signal and the second encryption key signal are the same. Therefore, when the transmission of information between the receiver 10 and the transmitter 30 is normal, a bit sequence equal to a corresponding portion of the bit sequence of the key information (the second random number signal) read out from the memory 22 is obtained as a result of the decryption of the received acknowledgment signal by the decryptor 32. Accordingly, in the case where the comparator 43 decides that the recovered original portion of the bit sequence which comes from the decryptor 32 matches the corresponding portion of the bit sequence of the key information (the second random number signal) fed from the key information generator 37, it is confirmed that the transmission of information between the receiver 10 and the transmitter 30 is normal and the same encryption key signal is stored in both the memory 21 in the receiver 10 and the memory 42 in the transmitter 30 (the common encryption key signal is held by the receiver 10 and the transmitter 30).

After it is confirmed that the common key signal is held by the receiver 10 and the transmitter 30, the stage S9 is replaced by a stage S10.

At the stage S10, the encryptor 36 in the transmitter 30 reads out the main information (the contents information) from the storage unit 44. The key selector 35 transmits the first encryption key signal from the memory 42 to the encryptor 36. The device 36 encrypts the main information in response to the first encryption key signal according to an encryption procedure such as DES (Data Encryption Standard), and thereby generates encryption-resultant main information. The encryptor 36 feeds the encryption-resultant main information to the multiplexer 38. The controller 48 sets the multiplexer 38 and the combiner 39 in through states in response to the comparison result signal from the comparator 43 so that the multiplexer 38 and the combiner 39 pass the encryption-resultant main information to the formatter 45. The formatter 45 processes the encryption-resultant main information on a block-by-block basis where every block has the given number of bits. The formatter 45 adds the second sync signal to the head of every block of the encryption-resultant main information. In addition, the formatter 45 adds an error check code signal (a CRCC signal) to the end of every block of the encryption-resultant main information. As a result, the device 45 formats the encryption-resultant main information into a final-version main signal (a final-version contents signal) consisting of the encryption-resultant main information, the second sync signals, and the CRCC signals. The formatter 45 sends the final-version main signal to the receiver 10.

Figure 8:
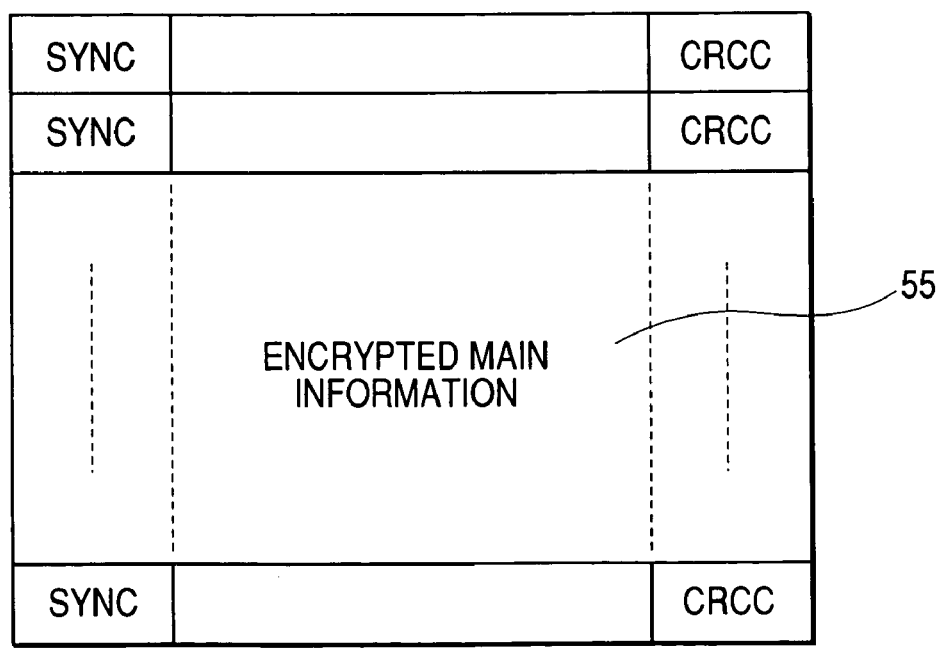
FIG. 8 is a diagram of the structure of a final-version main signal sent from the transmitter to the receiver in FIG. 1.

FIG. 8 shows the structure of the final-version main signal sent from the transmitter 30 to the receiver 10. In FIG. 8, there is a stack of rows which denote respective blocks of the final-version main signal. The blocks correspond to transmission units, respectively. The head and end of each block is occupied by the second sync signal "SYNC" and the error check code signal "CRCC", respectively. The intermediate portions of the blocks are occupied by the encryption-resultant main information 55.

With reference back to FIG. 4, at a stage S11 following the stage S10, the reception interface 15 in the receiver 10 receives the final-version main signal from the transmitter 30. The reception interface 15 passes the final-version main signal to the deformatter 23. The deformatter 23 removes the second sync signals "SYNC" and the error check code signals "CRCC" from the final-version main signal to recover the encryption-resultant main information. The recovered encryption-resultant main information is transmitted from the deformatter 23 to the decryptor 18 through the sync signal detector 17. The key selector 19 transmits the second encryption key signal from the memory 21 to the decryptor 18. The device 18 decrypts the encryption-resultant main information in response to the second encryption key signal, thereby recovering the original main information. The decryptor 18 feeds the recovered main information to a suitable apparatus such as a player, a display, or a recording apparatus.

In the information transmission system, the encryption and decryption which use the first and second random numbers are implemented by the encryptors 12 and 36, and the decryptors 18 and 32 which are hardware rather than software. Therefore, the information transmission system can perform authentication and key exchange at high speeds although the structure thereof is relatively simple. The encryption-resultant key information which originates from the second random number is embedded in the third random number before the third random number inclusive of the encryption-resultant key information is transmitted. Thus, the encryption-resultant key information can be safely transmitted while being concealed.

In the case where the comparator 43 in the transmitter 30 decides that the recovered original portion of the bit sequence which comes from the decryptor 32 does not match the corresponding portion of the bit sequence of the key information fed from the key information generator 37, it is found that an error occurs during the transmission of information. In this case, the controller 48 instructs the formatter 45 to generate a restart signal in response to the matching result signal fed from the comparator 43. The formatter 45 sends the restart signal to the receiver 10. The receiver 10 restarts the processing sequence from the stage S1 (see FIG. 4) in response to the restart signal. Specifically, the reception interface 15 in the receiver 10 accepts the restart signal. The reception interface 15 passes the restart signal to the receiver controller (not shown). The receiver controller instructs the generator 11 to produce a signal representative of a first random number which will be a base of a sync signal. In this way, the processing sequence is restarted from the stage S1. Preferably, the first random number generated during the restart is different from previous one.

In the receiver 10, an output circuit stage of the sync signal detector 17 or an input circuit stage of the decryptor 18 may be provided with an error detector for sensing an error or errors in the extracted encryption-resultant key information 52 in response to the parity signal 63. When an error or errors are sensed, the error detector feeds an error sensing notice to the receiver controller. In this case, the receiver controller operates to restart the processing sequence from the stage S1 (see FIG. 4) in response to the error sensing notice.

In the receiver 10, an output stage of the decryptor 18 may be provided with an error detector for sensing an error or errors in the recovered key information in response to the parity signal 58. When an error or errors are sensed, the error detector feeds an error sensing notice to the receiver controller. In this case, the receiver controller operates to restart the processing sequence from the stage S1 (see FIG. 4) in response to the error sensing notice.

Figure 9:
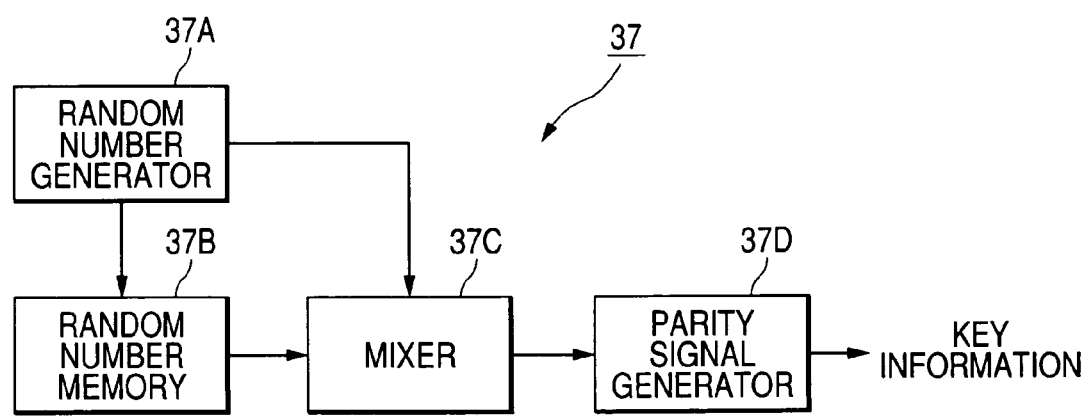
FIG. 9 is a block diagram of a key information generator in FIG. 3.

FIG. 9 shows an example of the structure of the key information generator 37. The key information generator 37 of FIG. 9 includes a random number generator 37A, a memory 37B, a mixer or multiplexer 37C, and a parity signal generator 37D. The random number generator 37A is connected with the memory 37B and the mixer 37C. The memory 37B is connected with the mixer 37C. The mixer 37C is connected with the parity signal generator 37D. The parity signal generator 37D leads to the encryptor 36, the encryption key generator 41, and the comparator 43 (see FIG. 3).

The random number generator 37A produces a signal representative of a periodically-updated basic random number. The random number signal 37A outputs the basic random number signal to the memory 37B and the mixer 37C. The memory 37B stores the basic random number signal at a prescribed timing. The memory 37B feeds the stored basic random number signal to the mixer 37C as effective bits of the second random number signal or an effective word to be encrypted. The mixer 37C alternates the stored basic random number signal fed from the memory 37B and the current basic random number signal outputted from the random number generator 37A to get the second random number signal (the key information). The mixer 37C feeds the key information to the parity signal generator 37D. The parity signal generator 37D produces a parity signal in response to the key information, and adds the produced parity signal to the end of the key information to complete a 128-bit key information word (a pair of 64-bit DES words). The parity signal generator 37D feeds the key-information word inclusive of the parity signal to the encryptor 36, the encryption key generator 41, and the comparator 43 (see FIG. 3).

Figure 10:
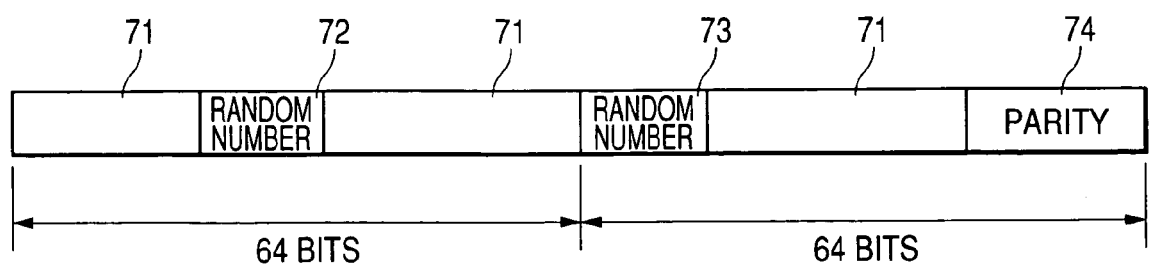
FIG. 10 is a diagram of the format taken by an output signal of the key information generator in FIG. 9.

FIG. 10 shows the format taken by a 128-bit key-information word (a pair of 64-bit DES words) outputted from the parity signal generator 37D (the key information generator 37). As shown in FIG. 10, an end of the key-information word is occupied by a parity signal 74 produced by the parity signal generator 37D. Successive bits composing the key-information word except the parity signal 74 are separated into first, second, third, fourth, and fifth groups which extend sequential predetermined bit-place zones respectively. The first, third, and fifth bit groups are assigned to an effective word 71 to be encrypted, that is, the stored basic random number signal fed from the memory 37B to the mixer 37C. Each of the second and fourth bit groups consists of ineffective bits or dummy bits independent of the effective word 71 to be encrypted. The second and fourth bit groups are assigned to portions 72 and 73 of the current basic random number signal fed from the random number generator 37A to the mixer 37C.

The ineffective bits (the dummy bits), that is, the portions 72 and 73 of the current basic random number signal in the key-information word, are updated for every execution of the processing sequence in FIG. 4. Thus, the bit pattern of the key-information word is renewed for every execution of the processing sequence in FIG. 4. Accordingly, a new key-information word generated as a result of the restart of the processing sequence from the stage S1 differs from previous one. This results in adequate security of the key information (the second random number signal) during the transmission.

The places of the ineffective bits (the dummy bits) 72 and 73 in a key-information word are predetermined or known to the receiver 10 and the transmitter 30 in advance. In the receiver 10, the decryptor 18 or the encryption key generator 20 removes the ineffective bits 72 and 73 from the decryption-resultant bit sequence so that the second encryption key signal will be generated from the decryption-resultant bit sequence void of the ineffective bits 72 and 73.

Second Embodiment

A second embodiment of this invention is similar to the first embodiment thereof except for an additional design mentioned later.

Figure 11:
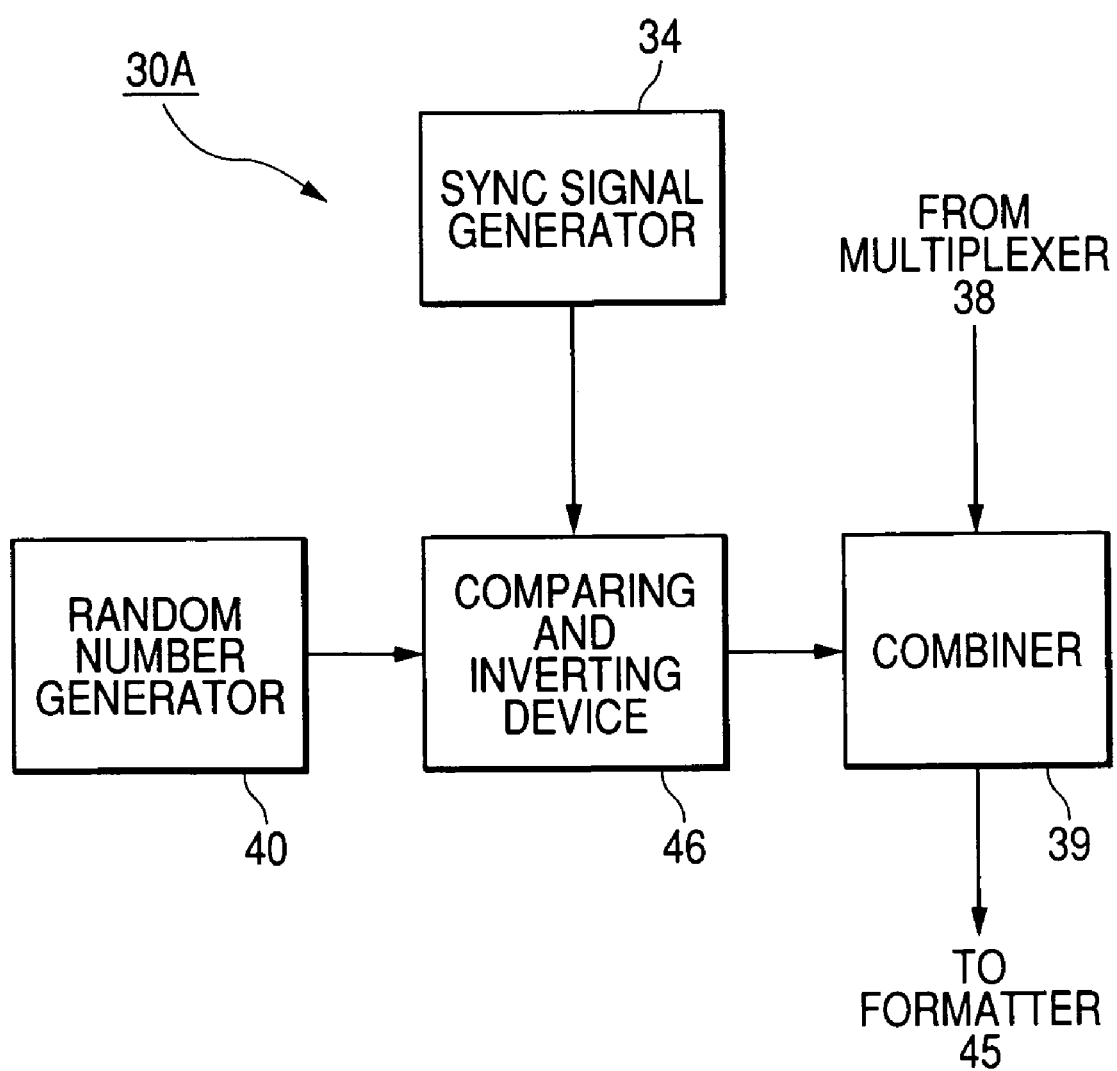
FIG. 11 is a block diagram of a part of a transmitter in an information transmission system according to a second embodiment of this invention.

FIG. 11 shows a part of a transmitter 30A in an information transmission system according to the second embodiment of this invention. The transmitter 30A is modified from the transmitter 30 (see FIG. 3) as follows.

The transmitter 30A in FIG. 11 includes a comparing and inverting device 46 connected among the sync signal generator 34, the combiner 39, and the random number generator 40.

The comparing and inverting device 46 receives the first sync signal (the key-data sync signal) from the sync signal generator 34. The comparing and inverting device 46 receives the third random number signal from the random number generator 40. The comparing and inverting device 46 compares the bit sequence of the first sync signal with a periodically-updated set of a given number of successive bits being latest and previous bits in the third random number signal. In the case where the result of the comparison indicates "disagreement", the comparing and inverting device 46 outputs the latest bit of the third random signal to the combiner 39 without changing the latest bit. In the case where the result of the comparison indicates "agreement", that is, in the case where the bit sequence pattern same as the first sync signal occurs in the third random number signal, the comparing and inverting device 46 inverts the latest bit of the third random signal and outputs the inversion-resultant bit to the combiner 39. As a result, the bit sequence pattern same as the first sync signal is removed from the third random number signal fed to the combiner 39. Thus, a false sync signal is prevented from occurring in the third random number signal fed to the combiner 39. The prevention of the occurrence of a false sync signal enables the receiver 10 to quickly and accurately detect the first sync signal.

What is claimed is:

1. An information transmission system comprising:
an information sending apparatus for sending encryption-resultant main information;
an information receiving apparatus for receiving the encryption-resultant main information from the information sending apparatus;
first means for, before the information sending apparatus sends the encryption-resultant main information to the information receiving apparatus, performing transmission of specified information between the information sending apparatus and the information receiving apparatus to enable the information sending apparatus and the information receiving apparatus to hold in common an encryption key used to encrypt original main information and decrypt the encryption-resultant main information;
second means for generating a first random number;
third means in the information receiving apparatus for sending the first random number generated by the second means toward the information sending apparatus;
fourth means in the information sending apparatus for generating a sync signal in response to the first random number sent from the information receiving apparatus;
fifth means in the information sending apparatus for generating key information relating to the encryption key;
sixth means for adding the key information generated by the fifth means to a position immediately following the sync signal generated by the fourth means to generate a set of the sync signal and the key information, wherein the sync signal indicates a position of the key information;
seventh means for generating a second random number;
eighth means for embedding the set of the sync signal and the key information which is generated by the sixth means in the second random number generated by the seventh means to generate a composite signal;

ninth means in the information sending apparatus for sending the composite signal generated by the eighth means toward the information receiving apparatus;

tenth means for generating the encryption key in response to the key information generated by the fifth means;

eleventh means for encrypting the original main information in response to the encryption key generated by the tenth means to generate the encryption-resultant main information;

twelfth means in the information sending apparatus for sending the encryption-resultant main information generated by the eleventh means toward the information receiving apparatus;

thirteenth means in the information receiving apparatus for detecting the sync signal in the composite signal sent from the information sending apparatus;

fourteenth means in the information receiving apparatus for extracting the key information from the composite signal in response to the sync signal detected by the thirteenth means;

fifteenth means in the information receiving apparatus for generating the encryption key in response to the key information extracted by the fourteenth means; and sixteenth means in the information receiving apparatus for decrypting the encryption-resultant main information sent from the information sending apparatus in response to the encryption key generated by the fifteenth means.

2. An information transmission system as recited in claim 1, wherein the information receiving apparatus comprises seventeenth means for holding a first predetermined key, and eighteenth means for encrypting the first random number in response to the first predetermined key to generate an encryption-resultant first random number, wherein the third means in the information receiving apparatus is operative for sending the encryption-resultant first random number generated by the eighteenth means toward the information sending apparatus, wherein the information sending apparatus comprises nineteenth means for holding a second predetermined key equal to the first predetermined key, and twentieth means for decrypting the encryption-resultant first random number sent from the information receiving apparatus in response to the second predetermined key to recover the first random number, and wherein the fourth means in the information sending apparatus is operative for generating the sync signal in response to the first random number recovered by the twentieth means.

3. An information transmission system as recited in claim 1, wherein the information sending apparatus comprises seventeenth means for generating a third random number, and eighteenth means for holding a first predetermined key, wherein the fifth means in the information sending apparatus is operative for encrypting the third random number in response to the first predetermined key to generate the key information, wherein the information receiving apparatus comprises nineteenth means for holding a second predetermined key equal to the first predetermined key, and twentieth means for decrypting the key information extracted by the fourteenth means in response to the second predetermined key to recover the third random number, and wherein the fifteenth means in the information receiving apparatus is operative for generating the encryption key in response to the third random number recovered by the twentieth means.

4. An information transmission system as recited in claim 1, further comprising seventeenth means for removing a portion equal in bit sequence pattern to the sync signal from the second random number generated by the seventh means to generate a processing-resultant random number, and wherein the eighth means is operative for embedding the set of the sync signal and the key information in the processing-resultant random number generated by the seventeenth means to generate the composite signal.

5. An information transmission system as recited in claim 1, wherein the information receiving apparatus comprises seventeenth means for encrypting at least a part of the key information extracted by the fourteenth means in response to the encryption key generated by the fifteenth means to generate an acknowledgment signal, and eighteen means for sending the acknowledgment signal generated by the seventeenth means toward the information sending apparatus, wherein the information sending apparatus comprises nineteenth means for decrypting the acknowledgment signal sent from the information receiving apparatus in response to the encryption key generated by the tenth means to generate a decryption-resultant signal, and twentieth means for deciding whether or not the decryption-resultant signal generated by the nineteenth means matches at least a corresponding part of the key information generated by the fifth means.

6. An information sending apparatus for use in an information transmission system, the information sending apparatus being operative for sending encryption-resultant main information, the information transmission system comprising an information receiving apparatus for receiving the encryption-resultant main information from the information sending apparatus, and means for, before the information sending apparatus sends the encryption-resultant main information to the information receiving apparatus, performing transmission of specified information between the information sending apparatus and the information receiving apparatus to enable the information sending apparatus and the information receiving apparatus to hold in common an encryption key used to encrypt original main information and decrypt the encryption-resultant main information, the information sending apparatus comprising:

first means for receiving a first random number from the information receiving apparatus;

second means for generating a sync signal in response to the first random number received by the first means;

third means for generating a second random number;

fourth means for generating the encryption key in response to the second random number generated by the third means;

fifth means for holding a predetermined key;

sixth means for encrypting the second random number generated by the third means in response to the predetermined key held by the fifth means to generate encryption-resultant key information;

seventh means for adding the sync signal generated by the second means to a position immediately preceding the encryption-resultant key information generated by the sixth means to generate a set of the sync signal and the encryption-resultant key information, wherein the sync signal indicates a position of the encryption-resultant key information;

eighth means for generating a third random number;

ninth means for embedding the set of the sync signal and the encryption-resultant key information which is generated by the seventh means in the third random number generated by the eighth means to generate a composite signal;

tenth means for sending the composite signal generated by the ninth means toward the information receiving apparatus;

eleventh means for encrypting the original main information in response to the encryption key generated by the fourth means to generate the encryption-resultant main information; and twelfth means for sending the encryption-resultant main information generated by the eleventh means toward the information receiving apparatus.

7. An information receiving apparatus for use in an information transmission system comprising an information sending apparatus for sending encryption-resultant main information, the information receiving apparatus being operative for receiving the encryption-resultant main information from the information sending apparatus, the information transmission system further comprising means for, before the information sending apparatus sends the encryption-resultant main information to the information receiving apparatus, performing transmission of specified information between the information sending apparatus and the information receiving apparatus to enable the information sending apparatus and the information receiving apparatus to hold in common an encryption key used to encrypt original main information and decrypt the encryption-resultant main information, the information receiving apparatus comprising:

first means for generating a first random number;

second means for sending the first random number generated by the first means toward the information sending apparatus;

third means for receiving, from the information sending apparatus, a composite signal in which a sync signal and encryption-resultant key information are embedded, the sync signal depending on the first random number sent by the second means, the encryption-resultant key information being added to a position immediately following the sync signal, the sync signal indicating a position of the encryption-resultant key information;

fourth means for detecting the sync signal in the composite signal received by the third means;

fifth means for extracting the encryption-resultant key information from the composite signal in response to the sync signal detected by the fourth means;

sixth means for holding a predetermined key;

seventh means for decrypting the encryption-resultant key information extracted by the fifth means in response to the predetermined key to generate decryption-resultant information;

eighth means for generating the encryption key in response to the decryption-resultant information generated by the seventh means;

ninth means for receiving the encryption-resultant main information from the information sending apparatus; and tenth means for decrypting the encryption-resultant main information received by the ninth means in response to the encryption key generated by the eighth means.

8. An information transmission system comprising a first apparatus and a second apparatus holding an encryption key in common, the system comprising:

first means in the first apparatus for receiving a first random number from the second apparatus;

second means for generating a sync signal in response to the first random number received by the first means;

third means in the first apparatus for holding the encryption key;

fourth means for generating key information relating to the encryption key held by the third means;

fifth means for adding the key information generated by the fourth means to a position immediately following the sync signal generated by the second means to generate a set of the sync signal and the key information, wherein the sync signal indicates a position of the key information;

sixth means for generating a second random number;

seventh means for embedding the set of the sync signal and the key information which is generated by the fifth means in the second random number generated by the sixth means to generate a composite signal;

eighth means in the first apparatus for sending the composite signal generated by the seventh means toward the second apparatus;

ninth means in the second apparatus for receiving the composite signal from the first apparatus;

tenth means in the second apparatus for generating the first random number;

eleventh means in the second apparatus for sending the first random number generated by the tenth means toward the first apparatus;

twelfth means for generating, in response to the first random number generated by the tenth means, a sync signal equal to the sync signal generated by the second means;

thirteenth means for comparing the sync signal generated by the twelfth means and the composite signal received by the ninth means to detect the sync signal in the composite signal;

fourteenth means for extracting the key information from the composite signal in response to the sync signal detected by the thirteenth means; and fifteenth means in the second apparatus for generating the encryption key in response to the key information extracted by the fourteenth means;

wherein the encryption key held by the third means in the first apparatus and the encryption key generated by the fifteenth means in the second apparatus are equal to each other.

9. An information transmission system as recited in claim 8, wherein the second apparatus comprises sixteenth means for encrypting at least a part of the key information extracted by the fourteenth means in response to the encryption key generated by the fifteenth means to generate acknowledgment information, and seventeenth means for sending the acknowledgment information generated by the sixteenth means toward the first apparatus, and wherein the first apparatus comprises eighteenth means for decrypting the acknowledgment information sent from the second apparatus in response to the encryption key held by the third means to generate decryption-resultant information, and nineteenth means for comparing the decryption-resultant information generated by the eighteenth means and at least a corresponding part of the key information generated by the fourth means to confirm whether the first apparatus and the second apparatus hold common key information.

10. An information sending apparatus for use in an transmission system comprising an information receiving apparatus, the information sending apparatus and the information receiving apparatus holding an encryption key in common, the information sending apparatus comprising:

first means for receiving a first random number from the information receiving apparatus;

second means for generating a sync signal in response to the first random number received by the first means;

third means for holding the encryption key;

fourth means for generating key information relating to the encryption key held by the third means;

fifth means for adding the key information generated by the fourth means to a position immediately following the sync signal generated by the second means to generate a set of the sync signal and the key information, wherein the sync signal indicates a position of the key information;

sixth means for generating a second random number;

seventh means for embedding the set of the sync signal and the key information which is generated by the fifth means in the second random number generated by the sixth means to generate a composite signal; and eighth means for sending the composite signal generated by the seventh means toward the information receiving apparatus;

wherein the composite signal enables the information receiving apparatus to have an encryption key equal to the encryption key held by the third means in the information sending apparatus.

11. An information receiving apparatus for use in an transmission system comprising an information sending apparatus, the information sending apparatus and the information receiving apparatus holding an encryption key in common, the information receiving apparatus comprising:

first means for generating a first random number;

second means for sending the first random number generated by the first means toward the information sending apparatus;

third means for receiving, from the information sending apparatus, a composite signal in which a sync signal and key information are embedded, the sync signal being generated by the information sending apparatus and depending on the first random number sent by the second means, the key information being added to a position immediately following the sync signal, the sync signal indicating a position of the key information;

fourth means for generating, in response to the first random number generated by the first means, a sync signal equal to the sync signal generated by the information sending apparatus;

fifth means for comparing the sync signal generated by the fourth means and the composite signal received by the third means to detect the sync signal in the composite signal;

sixth means for extracting the key information from the composite signal in response to the sync signal detected by the fifth means; and seventh means for generating the encryption key in response to the key information extracted by the sixth means;

wherein the encryption key generated by the seventh means is equal to the encryption key held by the information sending apparatus.

12. An information transmission system comprising:

a first apparatus;

a second apparatus;

first means in the first apparatus for generating a first random number signal;

second means for sending the first random number signal generated by the first means from the first apparatus to the second apparatus;

third means in the second apparatus for generating a signal representative of a first encryption key in response to original key information;

fourth means in the second apparatus for encrypting the original key information into cipher key information;

fifth means in the second apparatus for generating a sync signal in response to the first random number signal sent by the second means;

sixth means in the second apparatus for generating a second random number signal;

seventh means in the second apparatus for embedding the sync signal generated by the fifth means and the cipher key information generated by the fourth means in the second random number signal generated by the sixth means to get a composite signal in which the sync signal and the cipher key information are in a predetermined positional relation;

eighth means for sending the composite signal generated by the seventh means from the second apparatus to the first apparatus;

ninth means in the first apparatus for detecting the sync signal in the composite signal sent by the eighth means in response to the first random number signal generated by the first means;

tenth means in the first apparatus for detecting the cipher key information in the composite signal in response to the sync signal detected by the ninth means;

eleventh means in the first apparatus for decrypting the cipher key information detected by the tenth means to recover the original key information; and twelfth means in the first apparatus for generating a signal representative of a second encryption key in response to the original key information recovered by the eleventh means;

wherein the first encryption key in the second apparatus and the second encryption key in the first apparatus are equal.

* * * * *